US 9,808,937 B2

(12) United States Patent
Kumakura et al.

(10) Patent No.: US 9,808,937 B2
(45) Date of Patent: Nov. 7, 2017

(54) FILM SUCTION MECHANISM

(71) Applicant: Semiconductor Energy Laboratory Co., LTD., Atsugi-shi, Kanagawa-ken (JP)

(72) Inventors: Kayo Kumakura, Tochigi (JP); Satoru Idojiri, Tochigi (JP); Masakatsu Ohno, Tochigi (JP); Koichi Takeshima, Tochigi (JP); Yoshiharu Hirakata, Kanagawa (JP); Kohei Yokoyama, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/699,614

(22) Filed: Apr. 29, 2015

(65) Prior Publication Data
US 2015/0314456 A1 Nov. 5, 2015

(30) Foreign Application Priority Data

May 3, 2014 (JP) ................................ 2014-095581

(51) Int. Cl.
B25J 15/06 (2006.01)
B25J 11/00 (2006.01)
B25J 15/00 (2006.01)

(52) U.S. Cl.
CPC .......... B25J 15/0616 (2013.01); B25J 11/00 (2013.01); B25J 15/0004 (2013.01); B25J 15/0028 (2013.01); B25J 15/0061 (2013.01)

(58) Field of Classification Search
CPC ........ B25J 15/0616; B25J 11/00; B25J 19/02; B25J 15/0004; B25J 15/0028; B25J 15/0061; B65H 3/48
(Continued)

(56) References Cited

U.S. PATENT DOCUMENTS 4,129,328 A * 12/1978 Littell .................. B65G 47/918
294/65
4,451,028 A * 5/1984 Holmes .................. B65H 3/128
271/108
(Continued)

FOREIGN PATENT DOCUMENTS

JP 58-095051 A 6/1983
JP 60-082545 A 5/1985
(Continued)

OTHER PUBLICATIONS

International Search Report (Application No. PCT/IB2015/052926) Dated Jul. 28, 2015.
(Continued)

Primary Examiner — Dean Kramer
(74) Attorney, Agent, or Firm — Nixon Peabody LLP; Jeffrey L. Costellia

(57) ABSTRACT

A film suction mechanism is provided which can prevent a film-like member from warping or sagging for reliable suction, handing over, or the like of the film-like member. A film suction mechanism of the present invention is a film suction mechanism for processing or transferring a flexible film-like member. The film suction mechanism includes a suction unit having a function of attaching the film-like member thereto by suction and an air nozzle having a function of blowing pressurized air onto a first surface of the film-like member. The suction unit includes a plurality of suction pads. The suction unit is capable of attaching a second surface of the film-like member thereto by suction while the pressurized air is blown onto the first surface of the film-like member.

16 Claims, 5 Drawing Sheets

(58) Field of Classification Search
USPC ......... 294/183, 185, 188, 64.3, 65; 414/627, 414/737; 271/98
See application file for complete search history.

(56) References Cited

U.S. PATENT DOCUMENTS

| | | | | |
|---|---|---|---|---|
| 5,110,110 | A * | 5/1992 | Wirz | B65H 3/48 239/587.1 |
| 6,015,145 | A * | 1/2000 | Hartel | B65H 3/0875 270/52.2 |
| 6,345,818 | B1 * | 2/2002 | Stephan | B25J 15/0052 271/106 |
| 6,886,827 | B2 * | 5/2005 | Dachtler | B65H 3/0816 271/106 |
| 7,007,944 | B1 * | 3/2006 | Dobbertin | B65H 3/128 271/98 |
| 7,281,739 | B2 * | 10/2007 | Kniss | B25J 13/086 294/65 |
| 7,364,616 | B2 * | 4/2008 | Tsuchiya | B65H 3/0816 117/2 |
| 7,731,173 | B2 * | 6/2010 | Maruyama | B65G 59/045 271/105 |
| 8,367,440 | B2 | 2/2013 | Takayama et al. | |
| 8,496,425 | B2 * | 7/2013 | Lin | B25J 15/0052 192/223 |
| 2006/0170146 | A1 * | 8/2006 | Kato | B65H 3/0825 271/97 |
| 2015/0059986 | A1 | 3/2015 | Komatsu et al. | |
| 2015/0059987 | A1 | 3/2015 | Kumakura et al. | |
| 2015/0060933 | A1 | 3/2015 | Ohno et al. | |
| 2015/0075720 | A1 | 3/2015 | Hirakata et al. | |
| 2015/0151531 | A1 | 6/2015 | Ohno et al. | |

FOREIGN PATENT DOCUMENTS

| | | |
|---|---|---|
| JP | H10-337503 | 12/1998 |
| JP | 2012-101901 A | 5/2012 |
| JP | 2013-106525 A | 6/2013 |
| JP | 2013-216429 | 10/2013 |

OTHER PUBLICATIONS

Written Opinion (Application No. PCT/IB2015/052926) Dated Jul. 28, 2015.

* cited by examiner

FILM SUCTION MECHANISM

TECHNICAL FIELD

The present invention relates to a film suction mechanism for processing or transferring flexible film-like members. The present invention relates more specifically to a film suction mechanism which can prevent a film-like member from warping or sagging for easy suction, handing over, or the like of the film-like member.

BACKGROUND ART

In a conventional electronic stack body including a thin film transistor or the like, a thin plastic film-like member is used. This thin film-like member should not be touched with worker's hands and is therefore attached by suction to a robot hand having a suction pad or the like for transfer, handing over, or the like.

When the middle of the thin film-like member is held by suction, both ends thereof sag under their own weight. There has been a problem in that such a sagging film-like member cannot be easily held by suction for transfer, processing, or the like. In order to hold the thin film-like member by suction, it is necessary to maintain the flat shape thereof by preventing the end portions thereof from warping or sagging under their own weight. However, there has been no simple structure for reliably maintaining the flat shape of the film-like member.

As for films, there is a known technique for removing creases from films (see, for example, Patent Document 1). This technique enables creases to be removed from an object by blowing a pressing gas from above the object and pressing the object against a stage.

REFERENCE

[Patent Document 1] Japanese Published Patent Application No. 2013-216429

DISCLOSURE OF INVENTION

However, the technique in Patent Document 1 requires a stage to remove creases from an object because the creases are removed by pressing the object against the stage using a pressing gas. Therefore, the technique cannot be employed with a film suction mechanism which processes or transfers a film-like member without using a stage. For this reason, in the field of film suction mechanisms for processing or transferring a flexible film-like member, there has been a demand for the development of a film suction mechanism which has a simple structure and can prevent a film-like member from warping or sagging by a simple method for reliable suction, handing over, or the like.

The present invention was made to solve such conventional problems and achieves the following object. An object of the present invention is to provide a film suction mechanism which can prevent a flexible film-like member from warping or sagging for reliable suction, handing over, or the like of the film-like member.

The above-described object of the present invention is achieved by the following means. A first embodiment of the present invention is a film suction mechanism for processing or transferring a flexible film-like member. The film suction mechanism includes a suction unit having a function of attaching the film-like member thereto by suction and an air nozzle having a function of blowing pressurized air onto a first surface of the film-like member. The suction unit includes a plurality of suction pads. The suction unit is capable of attaching a second surface of the film-like member thereto by suction while the pressurized air is blown onto the first surface of the film-like member.

A second embodiment of the present invention is the film suction mechanism of the first embodiment of the present invention in which force components of a dynamic pressure of the pressurized air are directed in a suction direction of the suction pads and in a planar direction of the film-like member.

A third embodiment of the present invention is the film suction mechanism of the first or second embodiment of the present invention which further includes a swing drive mechanism for swinging a robot hand on an axis parallel to the surfaces of the film-like member when the film-like member is directly handed from the robot hand over to the film suction mechanism.

A fourth embodiment of the present invention is the film suction mechanism of any one of the first to third embodiments of the present invention in which the air nozzle blows the pressurized air when a suction error by the suction unit is detected.

The film suction mechanism of the present invention includes the air nozzle for blowing the pressurized air onto the first surface of the film-like member and the swing drive mechanism for swinging the robot hand. Therefore, a warp or a sag of the film-like member can be eliminated, and the second surface of the film-like member can be attached by suction in a state where the warp or sag has been eliminated. Accordingly, the film-like member can be easily and reliably held by suction by the suction pads of the film suction mechanism.

BEST MODE FOR CARRYING OUT THE INVENTION

Embodiments of film suction mechanisms of the present invention will be described below with reference to the accompanying drawings. The present invention relates to film suction mechanisms 1 and 2 for processing, e.g., bonding, or transferring a flexible film-like member (such as a film-like member of an electroluminescent element or a film-like member made of a synthetic resin used in a manufacturing process) 5.

Embodiment 1

The film suction mechanism 1 in Embodiment 1 of the present invention will be described with reference to FIGS.

Figure 1:
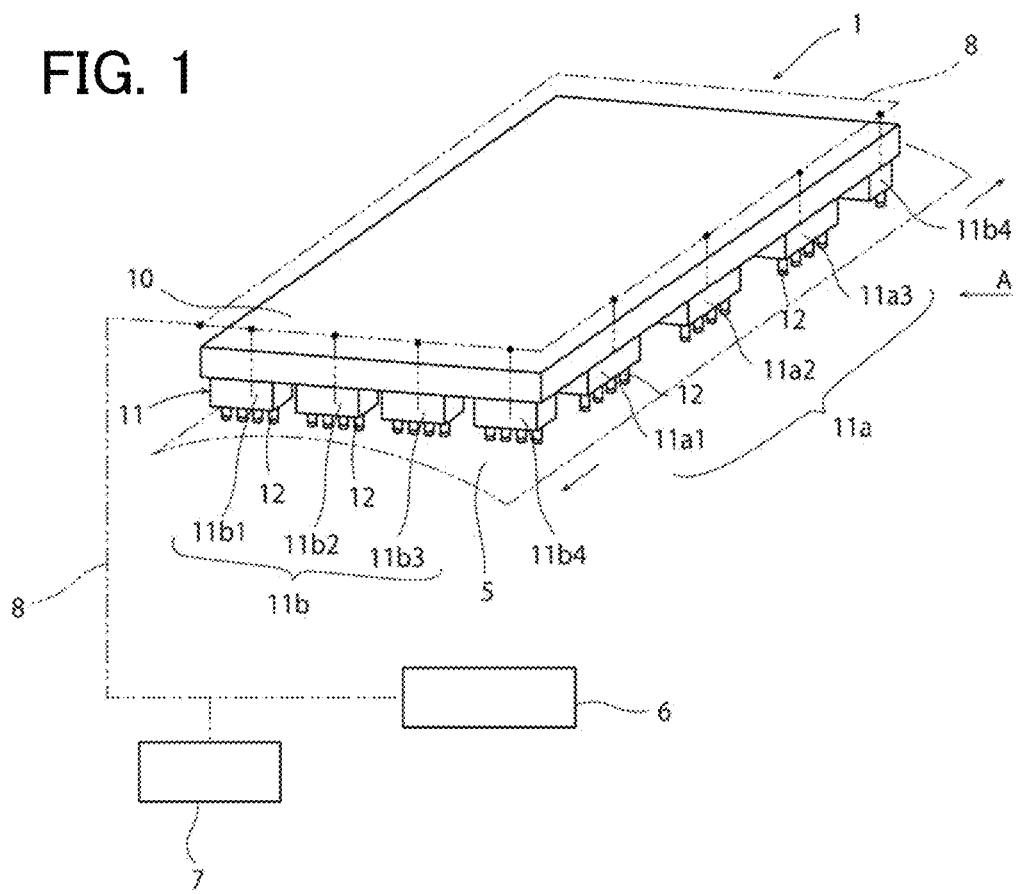
FIG. 1 schematically illustrates a film suction mechanism in Embodiment 1 of the present invention.
Figure 2:
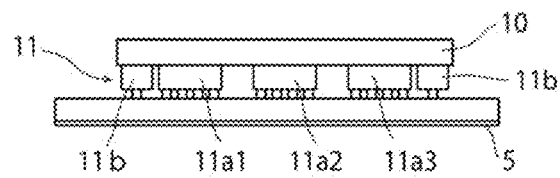
FIG. 2 is a side view of the film suction mechanism in Embodiment 1 which is seen from the direction A in FIG. 1 before an air nozzle blows pressurized air.
Figure 2:
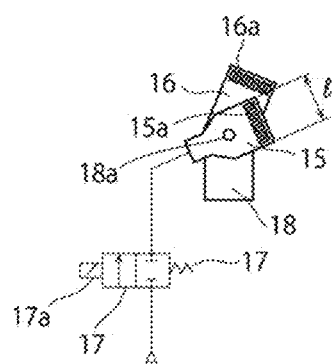
Figure 3:
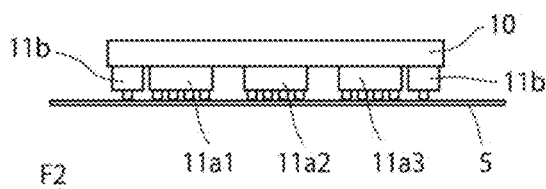
FIG. 3 is a side view of the film suction mechanism in Embodiment 1 which is seen from the direction A in FIG. 1 after the air nozzle blows pressurized air.
Figure 3:
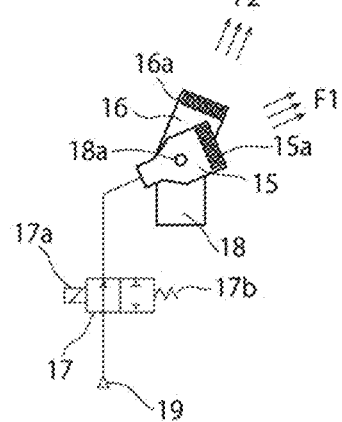
Figure 4:
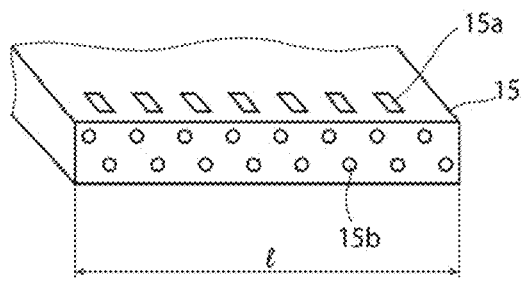
FIG. 4 is a partial external view of an air nozzle.

1 to 4. FIG. 1 schematically illustrates the film suction mechanism in Embodiment 1 of the present invention. FIG. 2 is a side view of the film suction mechanism in Embodiment 1 which is seen from the direction A in FIG. 1 before an air nozzle blows pressurized air. FIG. 3 is a side view which is seen after the air nozzle blows pressurized air. FIG. 4 is a partial external view of the air nozzle.

A plurality of suction units 11 are provided in a peripheral portion of a lower surface of a film hand 10, which is a robot hand, of the film suction mechanism 1. The film hand 10 is provided with a plurality of (e.g., three in this embodiment) suction units 11a (11a1 to 11a3) along a first side. Although not illustrated, the film hand 10 is also provided with a plurality of (e.g., three in this embodiment) suction units along a side opposite to the first side. A lower surface of each of the suction units 11a is provided with a plurality of suction pads 12.

The film hand 10 is provided with a plurality of (e.g., four in this embodiment) suction units 11b (11b1 to 11b4) along a second side perpendicular to the first side. Although not illustrated, the film hand 10 is also provided with a plurality of (e.g., four in this embodiment) suction units 11b along a side opposite to the second side. A lower surface of each of the suction units 11b is provided with a plurality of suction pads 12.

In other words, the lower surface of the film hand 10 is provided with the suction units 11 which are arranged in a rectangular shape. A film-like member 5 is held by vacuum suction by the suction pads 12 of the suction units 11a and 11b. The film-like member 5 can be easily transferred or bonded when successfully attached by suction to the suction pads 12 which are arranged in a rectangular shape. The suction pads 12 are formed using an elastically deformable material, have spaces inside, and attach an object (in this embodiment, a film-like member) thereto by suction owing to a negative internal pressure created by suction using a vacuum generation apparatus 6 with lower ends of the suction pads 12 in close contact with the object. The suction pads are also referred to as vacuum pads or the like, can be selected as appropriate from known ones depending on the size, weight, or the like of an object to be attached by suction, and are therefore not described in detail in this embodiment.

Note that the suction pads 12 are connected to the vacuum generation apparatus 6 via a vacuum circuit 8. The vacuum generation apparatus 6 has a known structure including a vacuum pump, a vacuum switching valve, and the like and is therefore not described in detail in this embodiment. The vacuum circuit 8 is provided with a pressure sensor 7, which is a suction error detecting means. In other words, in the case where the film-like member 5 is not attached by suction normally and a suction error occurs, the pressure sensor 7 senses that the pressure in the vacuum circuit 8 is not decreased to a predetermined pressure.

In some cases, when a transfer robot hand, for example, is inserted from the suction unit 11b side of the film hand 10 of such a film suction mechanism during handing over or the like, a film-like member may be attached by suction to not all suction pads but only the suction pads 12 of the suction units 11b2 and 11b3 located in or near the middle in FIGS. 1 and 2, as illustrated in FIGS. 1 and 2. In this state, the film-like member 5 is not attached by suction to the suction pads of the suction units 11a and 11b4 located at end portions in FIGS. 1 and 2 and sags downwards under its own weight. This state often causes problems in transfer, bonding, or the like.

In Embodiment 1, air nozzles (a first air nozzle 15 and a second air nozzle 16) are provided to blow pressurized air onto one surface (a first surface) of the film-like member 5 to press end portions of the other surface (a second surface) of the film-like member 5 against the suction pads 12 of the suction units 11a1, 11a2, 11a3, and 11b. Two pairs of air nozzles 15 and 16 are provided so as to blow pressurized air toward both the first side and the side opposite to the first side. Accordingly, the film-like member 5 can be prevented from sagging or warping and can be reliably held by suction by the suction pads 12 of the suction units 11 arranged in a rectangular shape.

The first air nozzles 15 and the second air nozzles 16 are set at angles at which the end portions of the film-like member 5 can be pressed, and are fixed by a bolt 18a to a mounting member 18 provided in a base body. Each of the first air nozzles 15 has a rectangular blow outlet portion with one side extending for length l as illustrated in FIG. 4, and this blow outlet portion has a plurality of (e.g., 16 in this embodiment) blow outlets 15b. The blow outlets 15b are arranged in two rows at predetermined intervals so as to eject air in a direction extending from a main body. In addition, the first air nozzle 15 has a plurality of ambient air inlets 15a for taking in ambient air and is configured to take in ambient air from the ambient air inlets 15a, mix the ambient air with pressurized air from an air supply source 19, and blow the pressurized air from the blow outlets 15b. Each of the second air nozzles 16 has a shape and a structure similar to those of the first air nozzle 15 and has blow outlets 15b and ambient air inlets 16a. The first air nozzle 15 and the second air nozzle 16 have a known structure disclosed in Japanese Published Patent Application No. H10-337503 or the like and are therefore not described in detail in this embodiment.

The first air nozzle 15 blows pressurized air from the blow outlets 15b in a direction indicated by arrows F1 illustrated in FIG. 3 by controlling the switching of a direction switching valve 17. The second air nozzle 16 blows pressurized air from blow outlets (not illustrated) in a direction indicated by arrows F2 illustrated in FIG. 3 by controlling the switching of a direction switching valve (not illustrated). Force components of a dynamic pressure of the pressurized air are directed in a suction direction of the suction pads 12 and in a planar direction of the film-like member 5. For example, pressurized air is blown by magnetizing a solenoid 17a to switch the position of a spool of the direction switching valve 17, and the blow of pressurized air is stopped by demagnetizing the solenoid 17a. When the solenoid 17a is demagnetized, the direction switching valve 17 switches the position of the spool by the action of a spring 17b. Like the first air nozzle 15, the second air nozzle 16 controls the blow with a direction switching valve (not illustrated). The first air nozzle 15 and the second air nozzle 16 blow pressurized air in directions toward the suction pads 12 arranged along two sides facing each other. Reference numeral 19 denotes an air pressure source.

The first air nozzle 15 and the second air nozzle 16 blow pressurized air when the film hand holds the film-like member 5 by suction over a tray (not illustrated) or a cassette (not illustrated) where film-like members 5 are stacked or over a stage (not illustrated) where the film-like member 5 is temporarily placed, for example. The film suction mechanism 1 blows pressurized air from the first air nozzle 15 and the second air nozzle 16 onto the end portions of the one surface (the first surface) of the film-like member 5, thereby pressing the end portions of the other surface (the second surface) of the film-like member 5 against the suction pads 12 of the suction units 11a. Accordingly, the film-like member 5 can be prevented from sagging or warping and can be reliably held by suction by the suction pads 12 of the suction units 11 arranged in a rectangular shape. Whether the film-like member 5 is successfully attached by suction can be checked by the pressure sensor 7.

In the case where the film-like member 5 is not attached by suction normally and the suction error is detected by the pressure sensor 7, pressurized air may be blown again from the first air nozzle 15 and the second air nozzle 16 onto the one surface of the film-like member 5 so that the end portions of the other surface of the film-like member 5 are pressed against and attached by suction to the suction pads 12 of the suction units 11a.

Embodiment 2

The film suction mechanism 2 in Embodiment 2 of the present invention will be described with reference to FIGS. 5A to 5D and FIG. 6. Note that like the film suction mechanism 1 described above, the film suction mechanism 2 has a structure in which the suction units 11 are connected to the vacuum circuit 8, the vacuum generation apparatus 6, the pressure sensor 7, and the like, which are therefore not described in detail here. FIGS. 5A to 5D illustrate a method for handing over the film-like member 5 with the film suction mechanism 2 in Embodiment 2. FIG. 6 schematically illustrates a swing drive mechanism provided in the film suction mechanism in Embodiment 2.

Figure 5A:
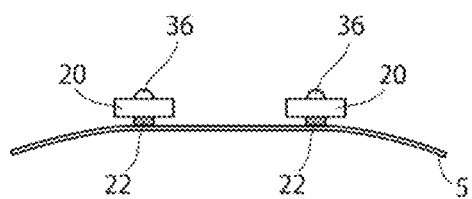
FIGS. 5A to 5D illustrate a method for handing over a film-like member with a film suction mechanism in Embodiment 2.
Figure 5B:
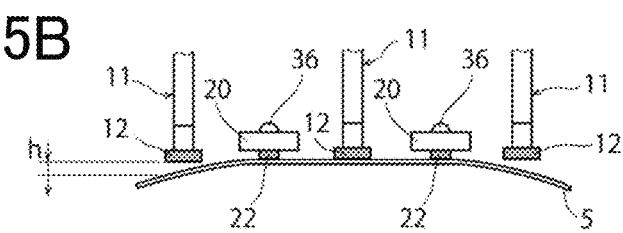
Figure 6:
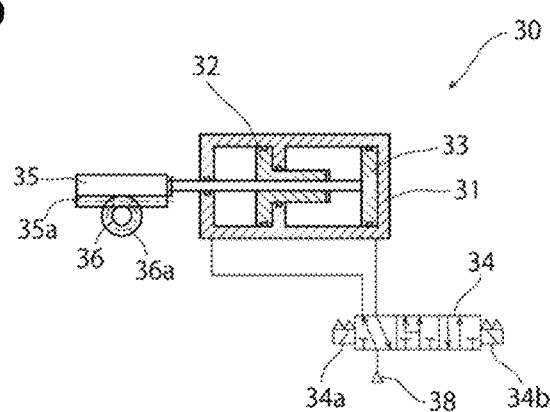
FIG. 6 schematically illustrates a swing drive mechanism provided in the film suction mechanism in Embodiment 2.

When one surface of the film-like member 5 is held by suction by suction pads 22 of film hands 20, which are robot hands, of the film suction mechanism 2, both ends thereof sag under their own weight as illustrated in FIGS. 5A and 5B. The film-like member 5 cannot be held by suction by the suction units 11 at both ends because there are gaps h between these suction units 11 and the film-like member 5 as illustrated in FIG. 5B. In order to solve this problem, in this embodiment, the film hands 20 are provided with a swing drive mechanism 30.

The suction units 11 are provided in the middle, at one end, and at the other end such that the two film hands 20 are located therebetween. The suction units 11 serve to lift the film-like member 5 by vacuum suction. A lower portion of each of the suction units 11 is provided with the suction pads 12.

A lower surface of each of the film hands 20 is provided with the suction pad 22. The film hand 20 is provided with a hand support shaft portion 36 on the side opposite to the viewer side of FIGS. 5A to 5D. The hand support shaft portion 36 is supported by a bearing portion (not illustrated) so as to be able to swing in the direction of rotation of the hand support shaft portion 36. The hand support shaft portion 36 is provided with a pinion 36a. The pinion 36a engages with a rack 35a of a rack body 35. The rack body 35 is fixed to a piston rod of a three-position cylinder. The three-position cylinder includes a cylinder main body 31, a first piston 32, a second piston 33, and the like. The three-position cylinder enables movement to three positions, a first position, a second position, and an intermediate position, by switching a direction switching valve 34.

In other words, when a first solenoid 34a is magnetized, the piston rod of the second piston 33 is positioned at the most backward position (the first position). When a second solenoid 34b is magnetized, the piston rod of the second piston 33 is positioned at the most forward position (the second position). Furthermore, when the first solenoid 34a and the second solenoid 34b are demagnetized, the piston rod of the second piston 33 is positioned at the intermediate position. This back and forth movement of the piston rod of the second piston 33 causes the hand support shaft portion 36 to swing through the rack 35a and the pinion 36a. The swing drive mechanism 30 includes the three-position cylinder (31, 32, and 33), the rack and pinion mechanism (35a and 36a), the direction switching valve 34, and the like. Reference numeral 38 denotes an air pressure source.

The suction units 11 are moved downward toward the film-like member 5 held by suction by the film hands 20 as illustrated in FIG. 5A. As illustrated in FIG. 5B, the film-like member 5 is attached by vacuum suction to the suction unit 11 located in the middle.

Figure 5C:
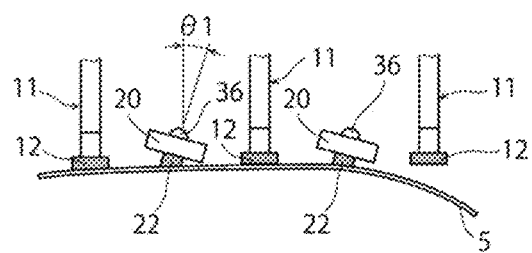
Figure 5D:
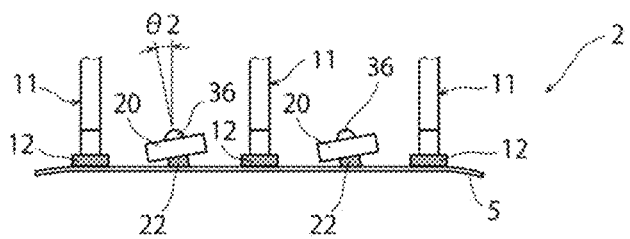

When the swing drive mechanism 30 causes each of the film hands 20 to swing on an axis of the hand support shaft portion 36 in the clockwise direction in FIGS. 5A to 5D by a predetermined amount (θ1), the left side of the film-like member 5 in FIGS. 5A to 5D is lifted and attached by vacuum suction to the suction unit 11 located on the left (see FIG. 5C). Then, when the swing drive mechanism 30 causes each of the film hands 20 to swing on the axis of the hand support shaft portion 36 in the counterclockwise direction in FIGS. 5A to 5D by a predetermined amount (e.g., θ2), the right side of the film-like member 5 in FIGS. 5A to 5D is lifted and attached by vacuum suction to the suction unit 11 located on the right (see FIG. 5D).

In this manner, the swing drive mechanism 30 enables the film-like member 5 to be reliably handed from the film hands 20 over to the suction units 11 even in a state where both ends of the film-like member 5 sag.

Other Embodiments

Although embodiments of the present invention are described above, it is obvious that the present invention is not limited to these embodiments and can be changed or modified without deviating from the object or spirit of the present invention. For example, the swing drive mechanism may have another structure as long as it can swing robot hands (film hands). The film suction mechanism may have a reverse structure in which suction surfaces of suction pads face upward so that a lower surface of the film-like member can be attached by suction to the suction pads. The robot hand in the present invention and embodiments also means a hand of a transfer apparatus which is not a so-called robot. The suction surfaces of the suction pads may be directed in a direction parallel or oblique to the direction of gravity. Furthermore, the film suction mechanism may be capable of magnetic suction of a film-like member when the film-like member is metal foil or the like.

EXPLANATION OF REFERENCE 1, 2: film suction mechanism, 5: film-like member, 10: film hand, 11: suction unit, 12: suction pad, 15: first air nozzle, 16: second air nozzle, 17: direction switching valve, 20: film hand (robot hand), 22: suction pad, and 30: swing drive mechanism.

This application is based on Japanese Patent Application serial no. 2014-095581 filed with Japan Patent Office on May 3, 2014, the entire contents of which are hereby incorporated by reference.

The invention claimed is:
1. An apparatus comprising:
a film suction mechanism for holding a flexible film having a first surface and a second surface, comprising:

a suction unit comprising a plurality of first suction pads;
an air nozzle configured to blow air onto the flexible film; and
a plurality of robot hands each comprising a second suction pad and a swing drive mechanism,
wherein the suction unit is configured to attach the second surface to the plurality of first suction pads by suction while the air is blown onto the first surface,
wherein in the suction unit, the flexible film is held with a part of the plurality of first suction pads located in or near the middle of the suction unit, and then the flexible film is held with all of the plurality of first suction pads by blowing air onto the first surface,
wherein the second suction pads of the plurality of robot hands are located between outermost two of the plurality of first suction pads, and
wherein the swing drive mechanism included in each of the plurality of robot hands is configured to swing the corresponding robot hand on an axis parallel to the flexible film, so that one of the plurality of first suction pads located outside the second suction pad is capable of attaching the flexible film.

2. The apparatus according to claim 1, wherein force components of a dynamic pressure of the air are directed in a suction direction of the plurality of first suction pads and in a planar direction of the flexible film.

3. The apparatus according to claim 1, wherein the air is blown when a suction error by the film suction mechanism is detected.

4. The apparatus according to claim 1, wherein the second suction pads and the others of the plurality of first suction pads are alternately provided between the outermost two of the plurality of first suction pads.

5. An apparatus comprising:
a film suction mechanism for holding a flexible film having a first surface and a second surface, comprising:
a suction unit comprising a plurality of first suction pads;
a first air nozzle configured to blow air toward a first side of the flexible film;
a second air nozzle configured to blow air toward a second side opposite to the first side of the flexible film; and
a plurality of robot hands each comprising a second suction pad and a swing drive mechanism,
wherein the suction unit is configured to attach the second surface to the plurality of first suction pads by suction while the air is blown onto the first surface,
wherein in the suction unit, the flexible film is held with a part of the plurality of first suction pads located in or near the middle of the suction unit, and then the flexible film is held with all of the plurality of first suction pads by blowing air onto the first surface,
wherein the second suction pads of the plurality of robot hands are located between outermost two of the plurality of first suction pads, and
wherein the swing drive mechanism included in each of the plurality of robot hands is configured to swing the corresponding robot hand on an axis parallel to the flexible film, so that one of the plurality of first suction pads located outside the second suction pad is capable of attaching the flexible film.

6. The apparatus according to claim 5, wherein force components of a dynamic pressure of the air are directed in a suction direction of the plurality of first suction pads and in a planar direction of the flexible film.

7. The apparatus according to claim 5, wherein the air is blown when a suction error by the film suction mechanism is detected.

8. The apparatus according to claim 5, wherein the second suction pads and the others of the plurality of first suction pads are alternately provided between the outermost two of the plurality of first suction pads.

9. An apparatus comprising:
a film suction mechanism for holding a flexible film, comprising:
a plurality of first suction pads;
an air nozzle under the plurality of first suction pads; and
a plurality of robot hands each comprising a second suction pad and a swing drive mechanism,
wherein the air nozzle is configured to blow air to the flexible film when the plurality of first suction pads hold the flexible film thereunder,
wherein the flexible film is held with a part of the plurality of first suction pads, and then the flexible film is held with all of the plurality of first suction pads by blowing air to the flexible film,
wherein the second suction pads of the plurality of robot hands are located between outermost two of the plurality of first suction pads, and
wherein the swing drive mechanism included in each of the plurality of robot hands is configured to swing the corresponding robot hand on an axis parallel to the flexible film, so that one of the plurality of first suction pads located outside the second suction pad is capable of attaching the flexible film.

10. The apparatus according to claim 9, wherein force components of a dynamic pressure of the air are directed in a suction direction of the plurality of first suction pads and in a planar direction of the flexible film.

11. The apparatus according to claim 9, wherein the air is blown when a suction error by the film suction mechanism is detected.

12. The apparatus according to claim 9, wherein the second suction pads and the others of the plurality of first suction pads are alternately provided between the outermost two of the plurality of first suction pads.

13. An apparatus comprising:
a film suction mechanism for holding a flexible film, comprising:
a plurality of first suction pads;
an air nozzle; and
a robot hand comprising a second suction pad and a swing drive mechanism, wherein:
the air nozzle is configured to blow air to the flexible film when the plurality of first suction pads hold the flexible film thereunder,
the flexible film is held with a part of the plurality of first suction pads, and then the flexible film is held with all of the plurality of first suction pads by blowing air onto the flexible film,
the swing drive mechanism is configured to swing the robot hand on a first axis parallel to the flexible film, and
the second suction pad is between two of the plurality of first suction pads which are arranged on a second axis perpendicular to the first axis.

14. The apparatus according to claim 13, wherein force components of a dynamic pressure of the air are directed in a suction direction of the plurality of first suction pads and in a planar direction of the flexible film.

15. The apparatus according to claim 13, wherein the air is blown when a suction error by the film suction mechanism is detected.

16. The apparatus according to claim 13, wherein the plurality of first suction pads is capable of attaching the flexible film by swinging the robot hand on the first axis parallel to the flexible film.

* * * * *